United States Patent
Ferringo et al.

(10) Patent No.: US 8,880,124 B2
(45) Date of Patent: Nov. 4, 2014

(54) COMMUNICATION DEVICE, METHOD AND SYSTEM FOR PROVIDING PREVIEWS OF VOICE CALLS

(75) Inventors: Bradley Shayne Ferringo, Marco Island, FL (US); Jerome Pasquero, Kitchener (CA); Noel John Orland Stonehouse, Waterloo (CA)

(73) Assignee: Blackberry Limited, Waterloo (CA)

( * ) Notice: Subject to any disclaimer, the term of this patent is extended or adjusted under 35 U.S.C. 154(b) by 169 days.

(21) Appl. No.: 13/309,240

(22) Filed: Dec. 1, 2011

(65) Prior Publication Data

US 2013/0143534 A1    Jun. 6, 2013

(51) Int. Cl.
    *H04M 1/00*    (2006.01)
(52) U.S. Cl.
    USPC ...... 455/567; 455/414.1; 370/258; 340/384.1
(58) Field of Classification Search
    CPC .............. H04M 19/04; H04M 19/045; H04M 3/42051; H04M 2203/4563; H04M 2203/653; H04N 21/42203; H04N 2201/3264; H04W 68/00
    USPC .............................................. 455/567, 414.1
    See application file for complete search history.

(56) References Cited

U.S. PATENT DOCUMENTS

| | | | |
|---|---|---|---|
| 7,904,067 B1* | 3/2011 | Tiwari et al. | 455/415 |
| 8,433,369 B2* | 4/2013 | Ambiru | 455/563 |
| 2007/0043739 A1 | 2/2007 | Takai et al. | |
| 2007/0220447 A1 | 9/2007 | Ray | |
| 2008/0005247 A9 | 1/2008 | Khoo | |
| 2010/0177877 A1 | 7/2010 | Hamaken | |
| 2012/0220347 A1* | 8/2012 | Davidson | 455/567 |

FOREIGN PATENT DOCUMENTS

| EP | 2387216 A1 | 11/2011 |
|---|---|---|
| WO | 2010048507 A1 | 4/2010 |

OTHER PUBLICATIONS

Extended European Search report mailed Apr. 5, 2012, in corresponding European patent application No. 11191502.1.
1-800-collect.com—http://www.1800collect.com/Publication1_files/FAQ.htm (1 of 3) [Nov. 28, 2011.
Sukeshini A. Grandhi—Telling Calls: Facilitating Mobile phone Conversation Grounding and Management. May 7-12, 2011; pp. 1-10.

* cited by examiner

*Primary Examiner* — Christopher M Brandt
*Assistant Examiner* — Joseph Dean, Jr.
(74) *Attorney, Agent, or Firm* — Novak Druce Connolly Bove + Quigg LLP

(57) ABSTRACT

A method, system and apparatus for providing previews of voice calls are provided. A voice call from a communication device to a remote communication device is initiated, via a communication interface. Sound data is received via a microphone, prior to the voice call being established. Preview data is transmitted in association with the voice call to the remote communication device, via the communication interface, the preview data indicative of the sound data, and the preview data for presentation at the remote communication device prior to the voice call being established.

18 Claims, 13 Drawing Sheets

COMMUNICATION DEVICE, METHOD AND SYSTEM FOR PROVIDING PREVIEWS OF VOICE CALLS

FIELD

The specification relates generally to communication devices, and specifically to a communication device, method and system for providing previews of voice calls.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
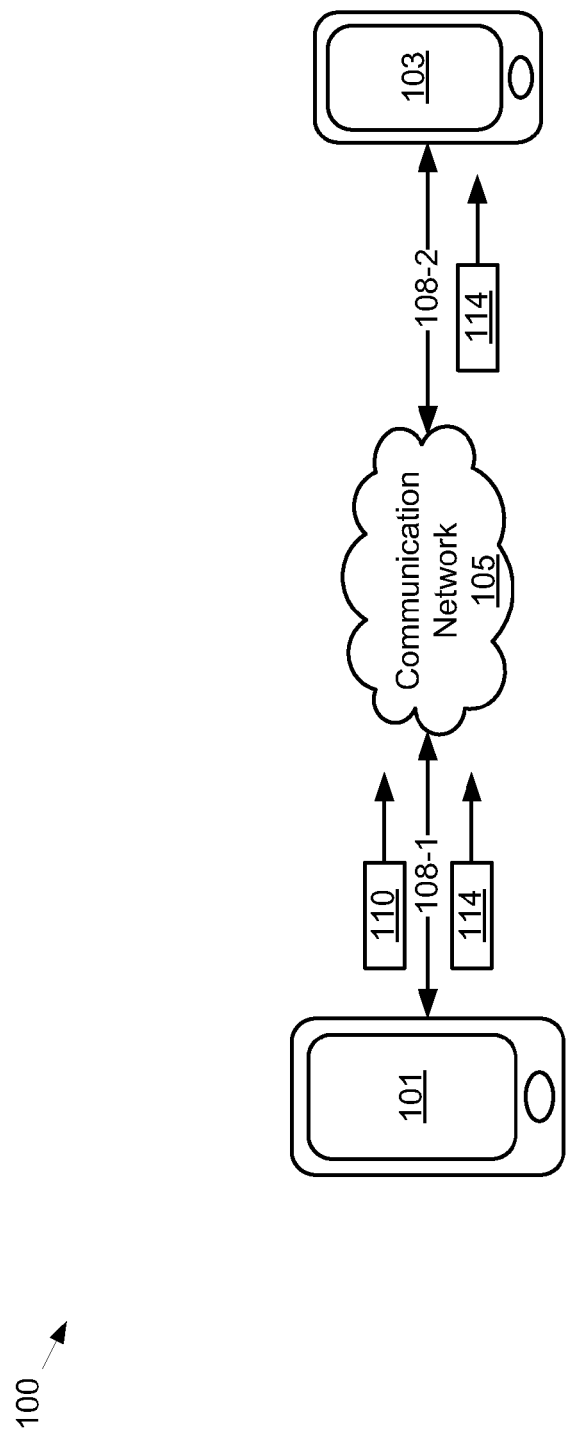
FIG. 1 depicts a system for providing previews of voice calls, according to non-limiting implementations.

An aspect of the specification provides a communication device comprising: a processor, a communication interface, and a microphone, the processor enabled to: initiate a voice call to a remote communication device, via the communication interface; receive sound data via the microphone, prior to the voice call being established; and, transmitting preview data in association with the voice call to the remote communication device, via the communication interface, the preview data indicative of the sound data, and the preview data for presentation at the remote communication device prior to the voice call being established.

The sound data can be received prior to initiation of the voice call.

The processor can be further enabled to: receive input data comprising an identifier of the remote communication device to initiate the voice call, wherein the sound data is received one of prior to receiving the input data and after receiving the input data.

The sound data can be received after receiving input data indicative the preview data is to be transmitted in association with the voice call. The processor can be further enabled to receive the input data by receiving actuation data indicative that an actuatable device associated with receiving the sound data has been actuated.

The sound data can be received after initiation of the voice call.

The sound data can be received after receiving at least a first ring tone after the initiation of the voice call, and any other sound data received at the microphone before the first ring tone is received is not transmitted.

The processor can be further enabled to receive the sound data by recording the sound data, such that the preview data comprises recorded sound data.

The processor can be further enabled to convert the sound data to text data such that the preview data comprises the text data.

The processor can be further enabled to receive text data via an input device, after initiation of the voice call but prior to the voice call being established, wherein the preview data is further indicative of the text data.

Another aspect of the specification provides a method comprising: initiating a voice call to a remote communication device via a communication interface of a communication device; receiving sound data at a microphone of the communication device, prior to the voice call being established; and, transmitting preview data in association with the voice call to the remote communication device, via the communication interface, the preview data indicative of the sound data, and the preview data for presentation at the remote communication device prior to the voice call being established.

The sound data can be received prior to initiation of the voice call.

The method can further comprise: receiving input data comprising an identifier of the remote communication device to initiate the voice call, wherein the sound data is received one of prior to receiving the input data and after receiving the input data.

The sound data can be received after receiving input data indicative the preview data is to be transmitted in association with the voice call. Receiving the input data can comprise receiving actuation data indicative that an actuatable device associated with receiving the sound data has been actuated.

The sound data can be received after initiation of the voice call.

The sound data can be received after receiving at least a first ring tone after the voice call initiation, and any other sound data received at the microphone before the first ring tone is received is not transmitted.

Re receiving the sound data can comprise recording the sound data, such that the preview data comprises recorded sound data.

The method can further comprise converting the sound data to text data such that the preview data comprises the text data.

Presentation of the sound data at the remote communication device prior to the voice call being established can comprise one or more of: presenting the preview data at a receiving device speaker; replacing a ringing tone at the device speaker with the preview data; providing the preview data at the device speaker as a notification of the voice call; and rendering the preview data at a receiving device display.

The method can further comprise receiving text data via an input device, after initiation of the voice call but prior to the voice call being established, wherein the preview data is further indicative of the text data.

A further aspect of the specification provides a computer program product, comprising a computer usable medium having a computer readable program code adapted to be executed to implement a method for: initiating a voice call to a remote communication device via a communication interface of a communication device; receiving sound data at a microphone of the communication device, prior to the voice call being established; and, transmitting preview data in association with the voice call to the remote communication device, via the communication interface, the preview data indicative of the sound data, and the preview data for presentation at the remote communication device prior to the voice call being established.

Yet a further aspect of the specification provides a communication device comprising: a processor, a communication interface, a display and a speaker, the processor enabled to: receive call initiation data, via the communication interface, the call initiation data indicative that a voice call can be established with a remote communication device; receive preview data of, via the communication interface, from the remote communication device in association with the call initiation data; and present the preview data at one or more of the speaker and the display after receiving the call initiation data and before the voice call is established, to provide one or more of an audible and a textual preview of the voice call.

The processor can be further enabled to: provide an option to accept or decline the preview data, wherein the preview data is provided only when the option to accept the preview data is selected.

The preview data can comprise one or more of: recorded sound data playable at the speaker to provide the audible preview of the voice call; and text data renderable at the display to provide the textual preview of the voice call.

To present the preview data, the processor can be further enabled to one or more of: replace a ringing tone at the device speaker with the preview data; and, provide the preview data at the device speaker as a notification of the voice call.

FIG. 1 depicts a system 100 comprising a communication device 101 enabled to communicate with at least one remote communication device 103 via a communication network 105 (also referred to hereafter as network 105), according to non-limiting implementations. Communication device 101 will be also referred to hereafter as device 101, and at least one remote communication device 103 will also be referred to hereafter generically as device 103. Each of device 101 and device 103 are linked to communication network 105 via a respective link 108-1, 108-2. Links 108-1, 108-2 will also be referred to hereafter generically as a link 108, and collectively as links 108. This convention will be used elsewhere in the present specification. It is appreciated that device 101 is generally enabled to initiate voice calls to device 103 via network 105, for example by transmitting call initiation data 110 to network 105, call initiation data 110 including, but not limited to, an identifier of device 103; network infrastructure (not depicted) in network 105 (e.g. a switch, a server, a PSTN (public switched telephone network) switch/server, a VoIP (voice over internet protocol) server, and the like) then provides suitable connections between network 105 and device 101, as well as suitable connections between network 105 and device 103, to cause device 103 to provide an alert of a voice call, which can be accepted or declined (and/or ignored). Hereafter the term "alert" will be used interchangeably with the term "notification".

The voice call is established device 103 when accepts the voice call, such that voice data can be exchanged between devices 101, 103. When the voice call is declined and/or ignored at device 103, the voice call is not established between devices 101, 103. However, it is appreciated that network 105 causes device 103 to provide an alert (e.g. ringing and the like) of the voice call by transmitting any suitable signal to device 103, and network 105 further causes device 101 to provide ring tones, for example via a speaker 228 (described below with reference to FIG. 2), to indicate that device 103 is presently providing an alert/notification of the voice call.

In any event, device 101 is further enabled to transmit preview data 114 in association with the voice call to device 103 for presentation at device 103 prior to the voice call being established, as will be explained hereafter.

Devices 101 can be any type of electronic device that can be used in a self-contained manner to interact with network 105 via link 108-1. Interaction includes displaying of information at device 101 as well as to receive input at device 101 that can in turn be sent to device 103 via network 105 and links 108.

It is hence appreciated that device 101 comprises any suitable communication device for communicating with network 105 and device 103, including but not limited to any suitable combination of computing devices, personal computers, laptop computers, portable electronic devices, mobile computing device, portable computing devices, tablet computing devices, laptop computing devices, PDAs (personal digital assistants), cellphones, smartphones and the like. Other suitable communication devices are within the scope of present implementations.

Device 103 can be similar to or different from device 101 and can include but is limited to any suitable combination of computing devices, personal computers, laptop computers, portable electronic devices, mobile computing device, portable computing devices, tablet computing devices, laptop computing devices, PDAs (personal digital assistants), cellphones, smartphones and the like. Other suitable communication devices are within the scope of present implementations. Further, while one device 103 is depicted in FIG. 1, it is appreciated that system 100 can comprise any suitable number of devices 103.

Each 108 comprises any suitable link with network 105, including any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

Network 105 can comprise any suitable combination of wired and/or wireless networks as desired, including but not limited to the Internet, the PSTN (public switched telephone network), analog networks, packet switched networks, WiFi networks, WiMax networks, and the like.

Figure 2:
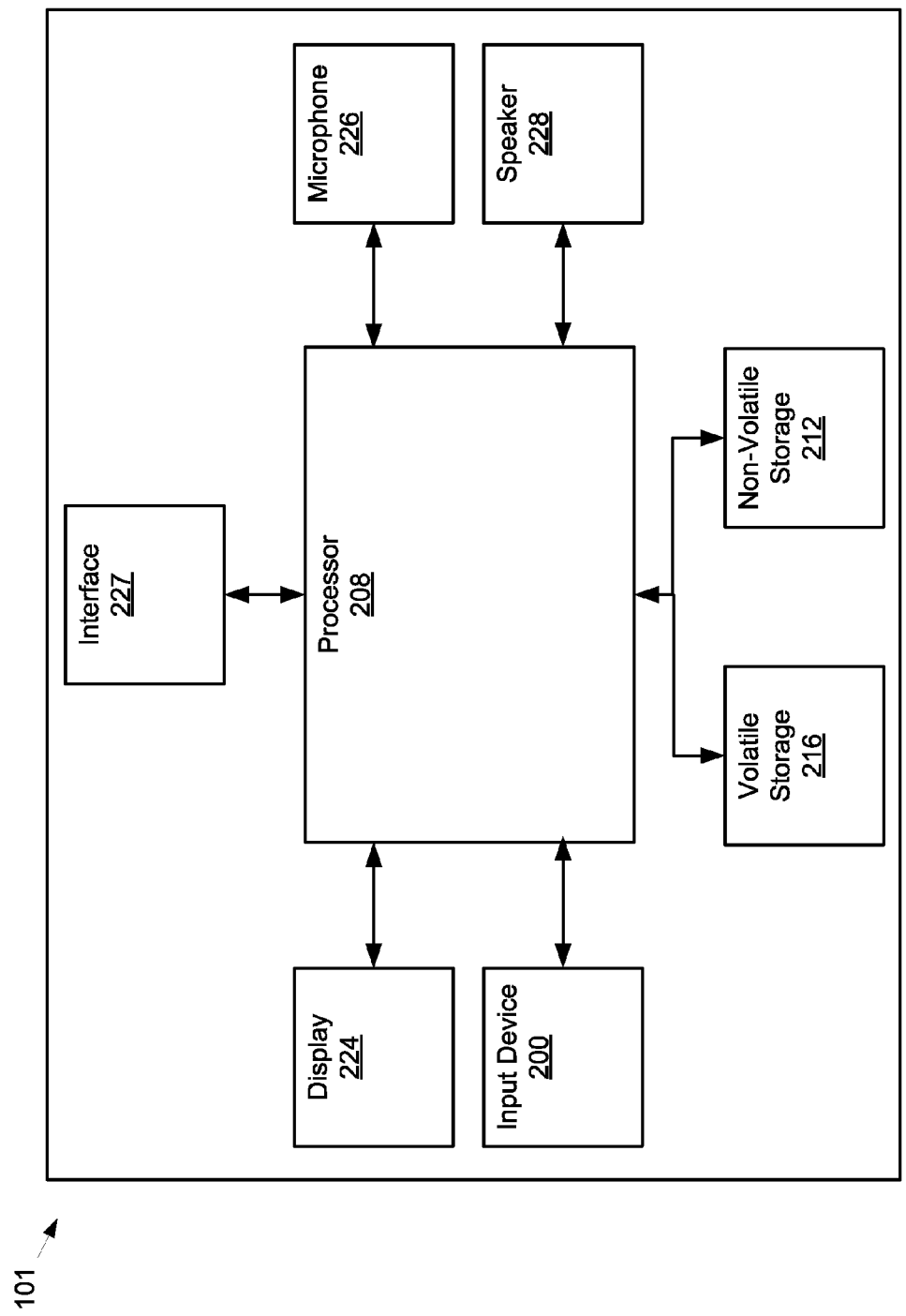
FIG. 2 depicts a device for providing previews of voice calls, according to non-limiting implementations, according to non-limiting implementations.

Attention is directed to FIG. 2, which depicts a schematic diagram of device 101 according to non-limiting implementations. It should be emphasized that the structure in FIG. 2 is purely exemplary, and contemplates a device that can be used for both wireless voice (e.g. telephony) and wireless data communications (e.g. email, web browsing, text, and the like). Device 101 comprises at least one input device 200 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 200 is received at processor 208 (which can be implemented as a plurality of processors). Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Programming instructions that implement the functional teachings of device 101 as described herein are typically maintained, persistently, in non-volatile storage unit 212 and used by processor 208 which makes appropriate utilization of volatile storage 216 during the execution of such programming instructions. Those skilled in the art will now recognize that non-volatile storage unit 212 and volatile storage 216 are examples of computer readable media that can store programming instructions executable on processor 208. Furthermore, non-volatile storage unit 212 and volatile storage 216 are also examples of memory units and/or memory modules.

Processor 208 in turn can also be configured to communicate with a display 224, a microphone 226 and optionally a speaker 228. Display 224 comprises any suitable one of or combination of CRT (cathode ray tube) and/or flat panel displays (e.g. LCD (liquid crystal display), plasma, OLED (organic light emitting diode), capacitive or resistive touchscreens, and the like).

Microphone 226 comprises any suitable microphone for receiving sound data, which can be transmitted to device 103. Speaker 228 comprises any suitable speaker for providing sound data at device 101. It is appreciated that microphone 226 and speaker 228 can be used in combination at device 101 to conduct a voice call with device 103.

In some implementations, input device 200 and display 224 are external to device 101, with processor 208 in communication with each of input device 200 and display 224 via a suitable connection and/or link.

Processor 208 also connects to a network communication interface 227, also referred to hereafter as interface 227, which can be implemented in some implementations as one or more radios configured to communicate over link 108-1. In general, it will be understood that interface 227 is configured to correspond with the network architecture that is used to implement link 108-1. In other implementations a plurality of links with different protocols can be employed and thus interface 227 can comprise a plurality of interfaces to support each link. It should be understood that in general a wide variety of configurations for device 101 are contemplated.

Figure 3:
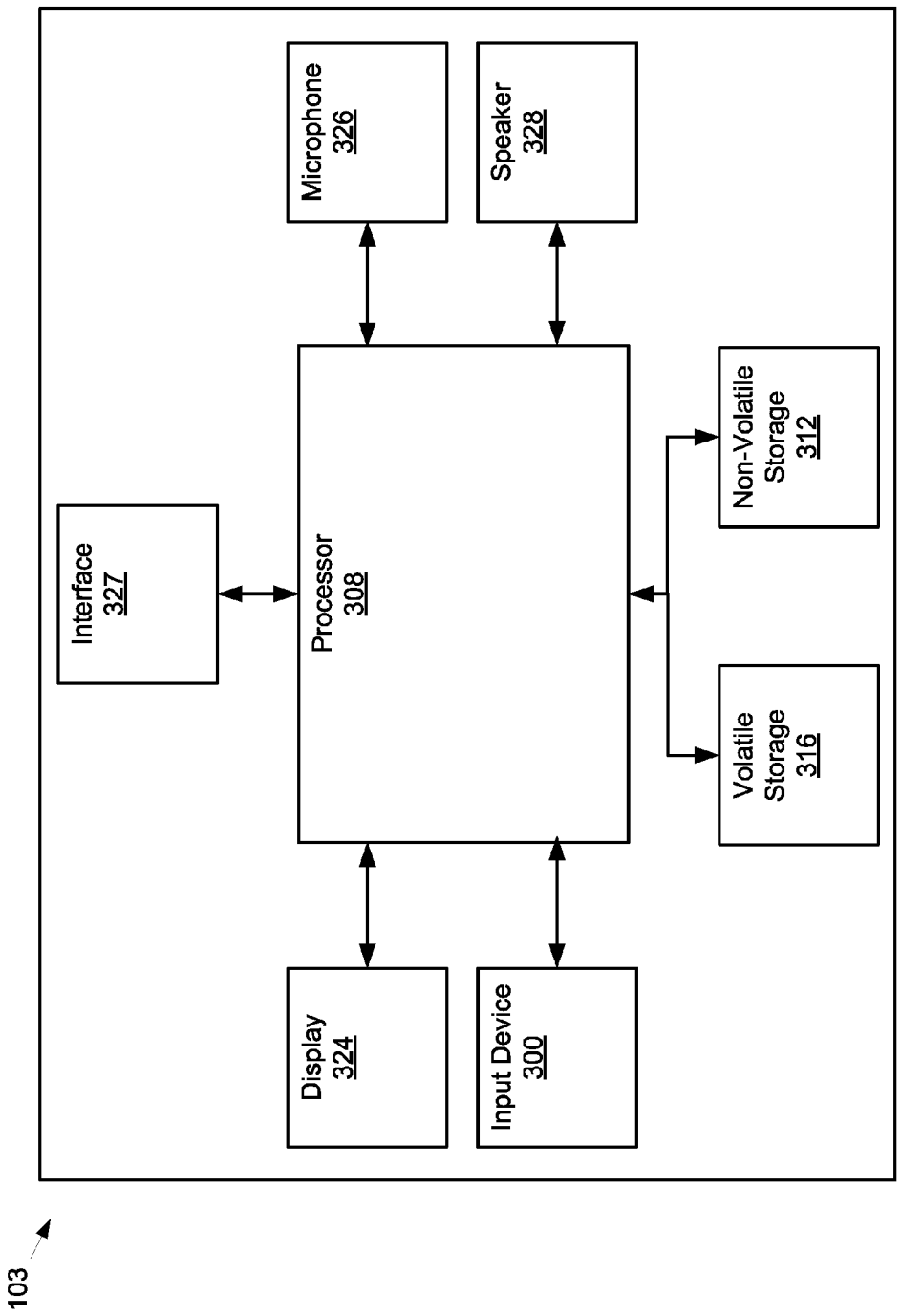
FIG. 3 depicts a device for receiving for providing previews of voice calls, according to non-limiting implementations.

Attention is next directed to FIG. 3, which depicts a schematic diagram of device 103 according to non-limiting implementations. It is appreciated that device 103 can be substantially similar to, or different from, device 101. In any event, FIG. 3 is substantially similar to FIG. 2, with like elements having like numbers, however preceded by a "3" rather than a "2"; for example, processor 308 is substantially similar to processor 208, input device 300 is substantially similar to input device 300, volatile storage 316 is substantially similar volatile storage 216, etc.

Figure 4:
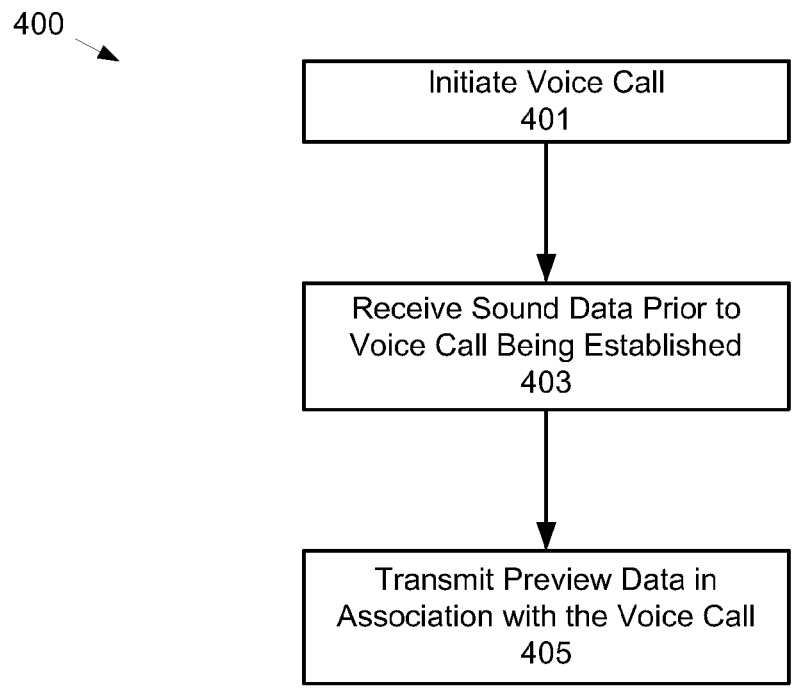
FIG. 4 depicts a method for providing previews of voice calls, according to non-limiting implementations.

Attention is now directed to FIG. 4 which depicts a method 400 for providing previews of voice calls. In order to assist in the explanation of method 400, it will be assumed that method 400 is performed using system 100. Furthermore, the following discussion of method 400 will lead to a further understanding of system 100 and its various components. However, it is to be understood that system 100 and/or method 400 can be varied, and need not work exactly as discussed herein in conjunction with each other, and that such variations are within the scope of present implementations.

It is appreciated that method 400 is implemented in system 100 by processor 208 of device 101.

Figure 5:
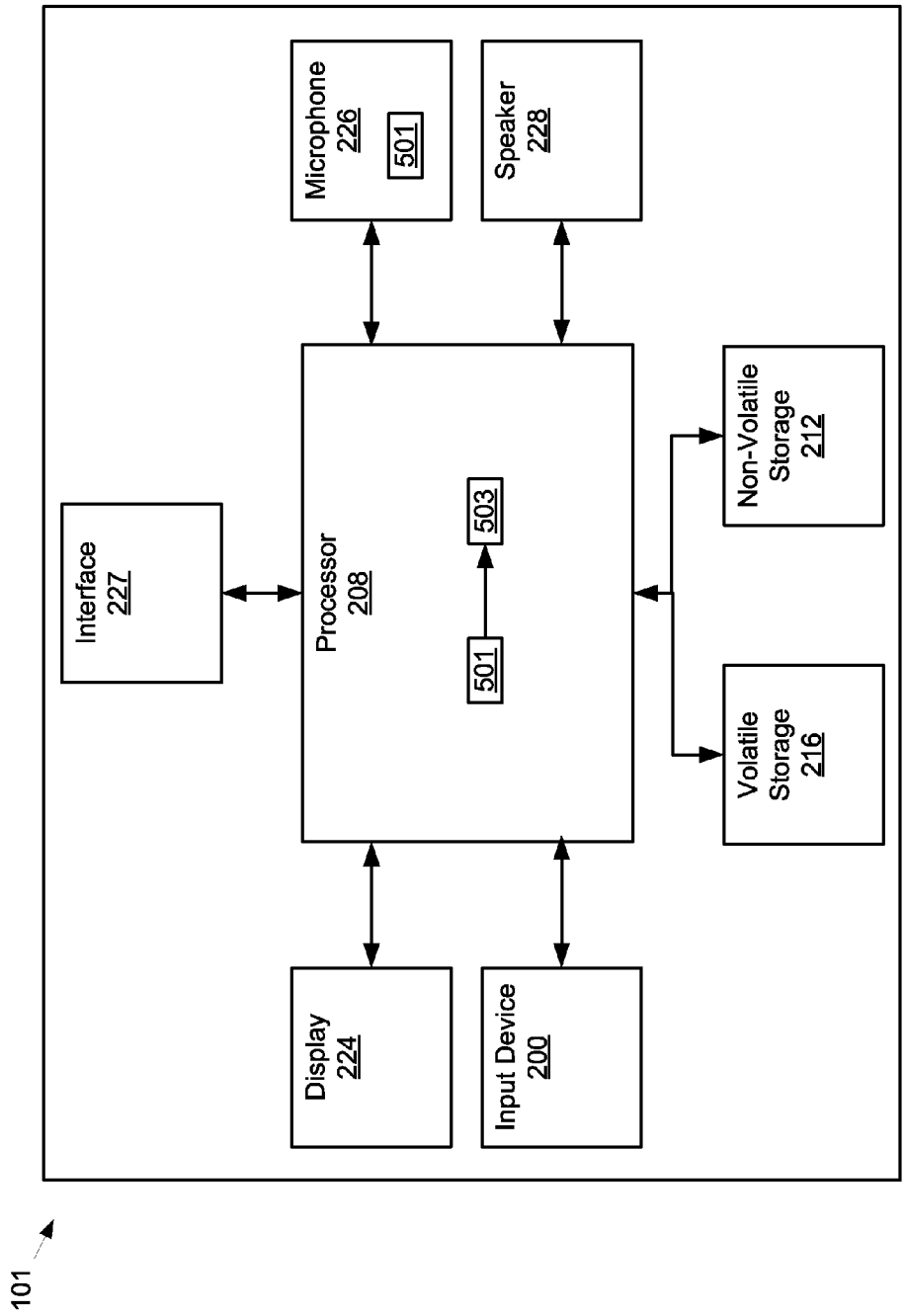
FIG. 5 depicts a device for providing previews of voice calls, according to non-limiting implementations, according to non-limiting implementations.
Figure 6:
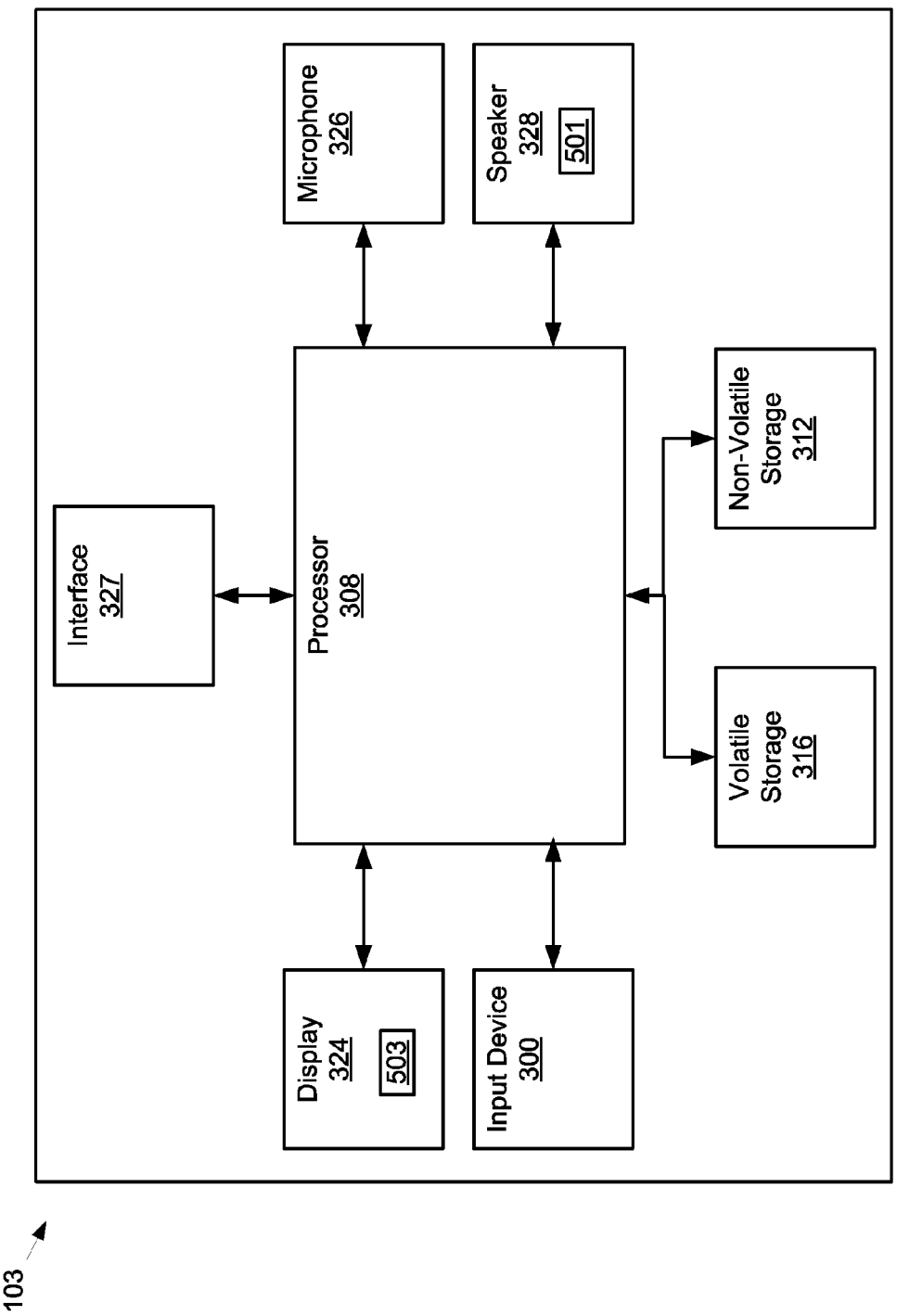
FIG. 6 depicts a device for receiving for providing previews of voice calls, according to non-limiting implementations.

Further, FIG. 4 will be described with reference to FIGS. 5 and 6, which are respectively substantially similar to FIGS. 2 and 3, respectively.

At block 401, a voice call is initiated to device 103 via interface 227. For example, call initiation data 110 is transmitted to network 105, which in turn causes device 103 to provide an alert of an incoming voice call.

At block 403, and with further reference to FIG. 4, sound data 501 is received at microphone 226 of communication device 101, prior to the voice call being established. As will presently be explained, sound data 501 can be received at any suitable time prior to the voice call being established, including but not limited to prior to call initiation data 110 being transmitted and after call initiation data 110 is transmitted.

In any event, it is appreciated that sound data 501 generally comprises audible data associated with the voice call as a preview of the voice call. For example, a user can provide sound data 501 by speaking into microphone 226 in association with initiating the voice call. In non-limiting example implementations, a user can provide information associated with the voice call, such as "Larry, it's Bob. Take this call as there's been an accident".

At block 405, and with further reference to FIG. 1, preview data 114 is transmitted in association with the voice call to device 103, via interface 227, network 105 and links 108. It is appreciated that preview data 114 is generally indicative of sound data 501, and that preview data 114 is for presentation at device 103 prior to the voice call being established. Further preview data 114 is routable to device 103 by network 105 and can hence, for example, comprise an identifier of device 103. Further preview data 114 comprises sound data 501 in one or more of an original form of sound data 501 and a processed form. For example, with reference to FIG. 4, in some implementations, sound data 501 can be optionally converted to text data 503 via processor 208, prior to transmission of preview data 114 to device 103.

In yet further implementations, receiving sound data 501 at block 403 comprises recording sound data 501, such that preview data 114 comprises recorded sound data. In other words, sound data 501 can recorded at device 101 and optionally stored at non-volatile storage 212, and the recording is transmitted in preview data 114. The recording can be stored indefinitely or deleted once preview data 114 is transmitted. Alternatively, sound data 501 can be transmitted in preview data 114 as sound data 501 is received, and a recording of sound data 501 is not stored at device 101.

It is yet further appreciated that, in some implementations, call initiation data 110 can comprise preview data 114 such that preview data 114 can be routed to device 103 by network 105 when network 105 is causing device 103 to provide an alert of the voice call. Hence, in these implementations, preview data 114 may not comprise an identifier of device 103 as the identifier of device 103 is provided in call initiation data 110.

In any event, preview data 114 can be provided to device 103 as metadata associated with the voice call such that, as device 103 is providing an alert of the voice call, preview data 114 is provided at device 103. For example, with reference to FIG. 6, when preview data 114 comprises sound data 501, sound data 501 can be provided at speaker 328 while device 103 is providing an alert of the voice call; in implementations where device 103 provides an audible alert, sound data 501 can be played along with the audible alert and/or in place of at least a portion of the audible alert. Alternatively, when preview data 114 comprises text data 503, text data 503 is provided at display 324 while the alert of the voice call is being provided.

Hence, returning to the example provided above, when device 103 is providing an alert of the voice call, preview data 114, in audible and/or textual form, is provided at device 103 such that the sound and/or text, "Larry, it's Bob. Take this call as there's been an accident", is provided at device 103. Providing preview data 114 can hence influence whether or not the voice call is accepted or declined.

In some implementations, sound data 501 can be received prior to initiation of the voice call. For example, attention is directed to FIG. 7, which depicts a Graphic User Interface (GUI) 701, rendered at display 224 of device 101, GUI 701 for initiating a voice call. GUI 701 comprises two virtual buttons 703, 705, each of which can be actuated, for example, via input device 200, e.g. when input device 200 comprises a touchscreen input device. Button 703 comprises an actuatable device (i.e. the area of the touchscreen input device corresponding to button 703) for initiating a voice call to a device 103 identified, for example, by information rendered at button 703 (i.e. "Larry" and/or a phone number "416 555 1234").

Button 705 comprises an actuatable device (i.e. the area of the touchscreen input device corresponding to button 705) for initiating receipt of preview data 114.

It is appreciated that while each of buttons 703, 705 are independently rendered at display 224, similar functionality can be provided as selectable options in a pull-down menu or the like.

It is further appreciated that, in some implementations, rendering of buttons 703, 705, or the like, can be provided with a PIM (personal information manager) application at device 101, such as a contacts application and/or and address book, and that prior to rendering of button 703, 705, the PIM application can be processed and navigated to select an identifier of device 103 such that a voice call can be initiated. Alternatively, a telephone application can be used to receive a telephone number or other identifier of device 103. In other words, input data comprising an identifier of device 103 is received to initiate the voice call. As will be explained hereafter, sound data 501 can be received one of prior to receiving the input data and after receiving the input data.

Figure 8:
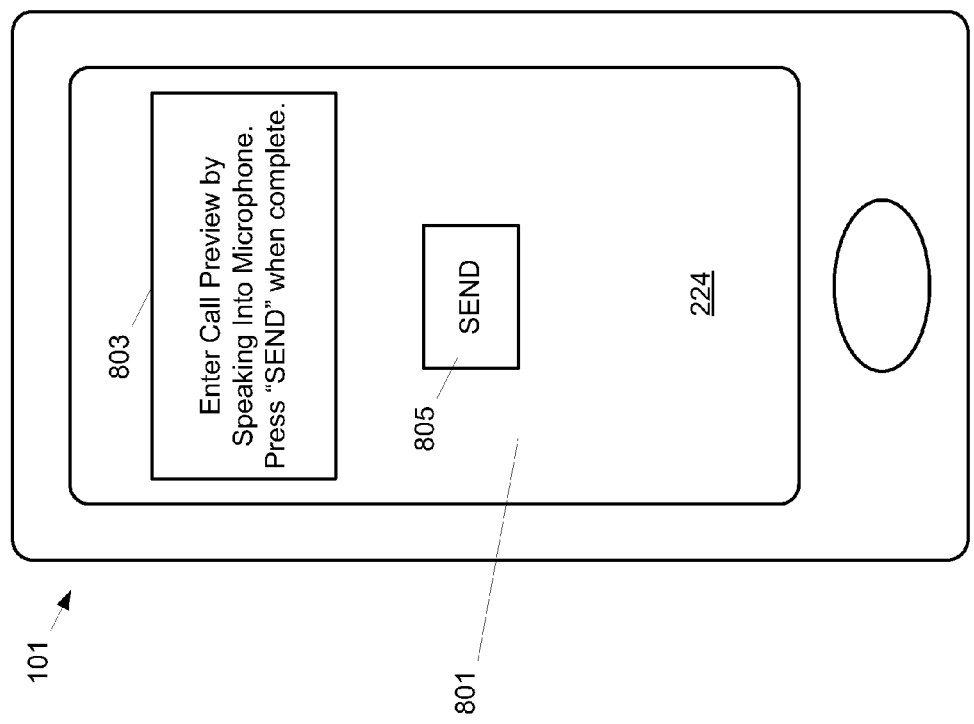

In some implementations, button 705 can be actuated prior to actuating of button 703, which causes a GUI 801, as depicted in FIG. 8, to be rendered at display 224 of device 101. GUI 801 comprises an indication 803 to enter sound data 501 by speaking into microphone 226, along with a virtual button 805 which can be actuated to indicate that entering of sound data 501 is complete. In some implementation, device 101 can be enabled to limit a size of sound data 501 to one or more of a given maximum length of time (for example a given maximum length ranging from 3 to 5 seconds, however the exact maximum length is not to be considered unduly limiting) and a given maximum size (e.g. a given maximum memory size, such as 3 to 5 kb, however this range is not to be considered unduly limiting), such that entering of sound data 501 is automatically concluded when one or more of the given length of time and the given size is reached. Such a limit on a size of sound data 501 can ensure that preview data 114 is relatively narrow band and does not significantly affect airtime and/or data billing.

In any event, once sound data 501 is received, either the voice call can be automatically initiated (e.g. once virtual button 805, "SEND" is actuated) or GUI 700 can be rendered again to wait for actuation of button 703.

Hence, in these implementations, preview data 114 can be transmitted one or more of independently from call initiation data 110, as a subset of call initiation data 110, before call initiation data 110 and after call initiation data 110.

Figure 9:
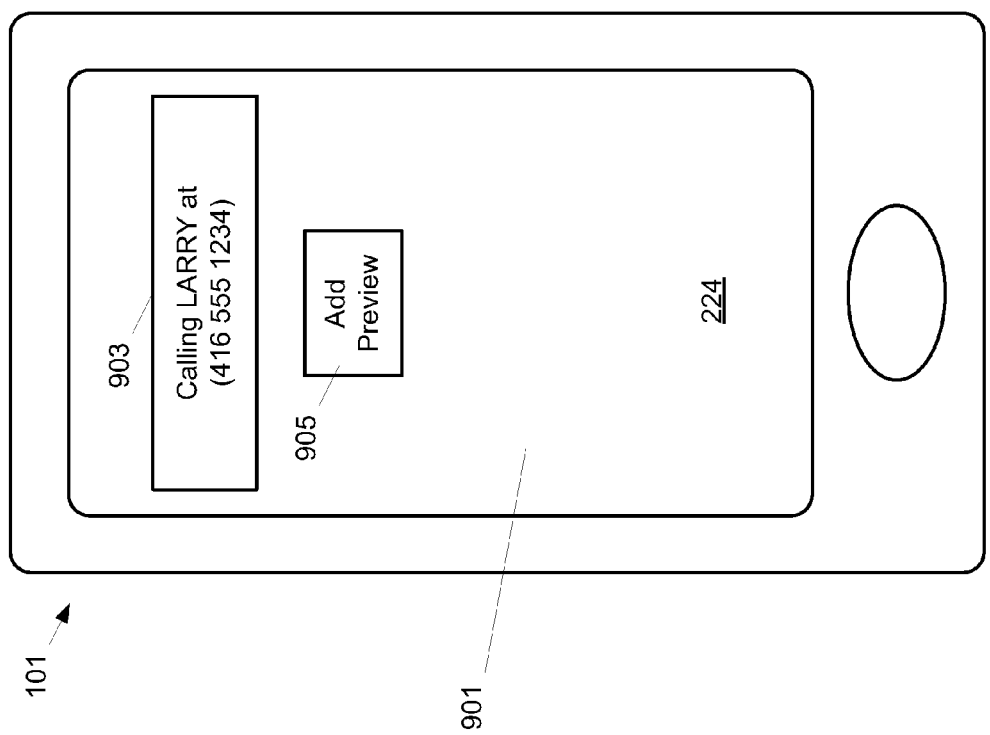

For example, attention is next directed to FIG. 9, which depicts a GUI 901 to be rendered at display 224 of device 101 after a voice call is initiated (e.g. after call initiation data 110 is transmitted). GUI 901 comprises an indication 903 that a voice call is being initiated, along with a virtual button 905 similar to virtual button 705, to initiate receipt of sound data 501. In other words, while speaker 228 is providing an indication that the voice call is being attempted (i.e. ring tones are played at speaker 228), sound data 501 can be received at microphone 226 and transmitted to device 103. Hence, sound data is received after initiation of the voice call.

Figure 7:
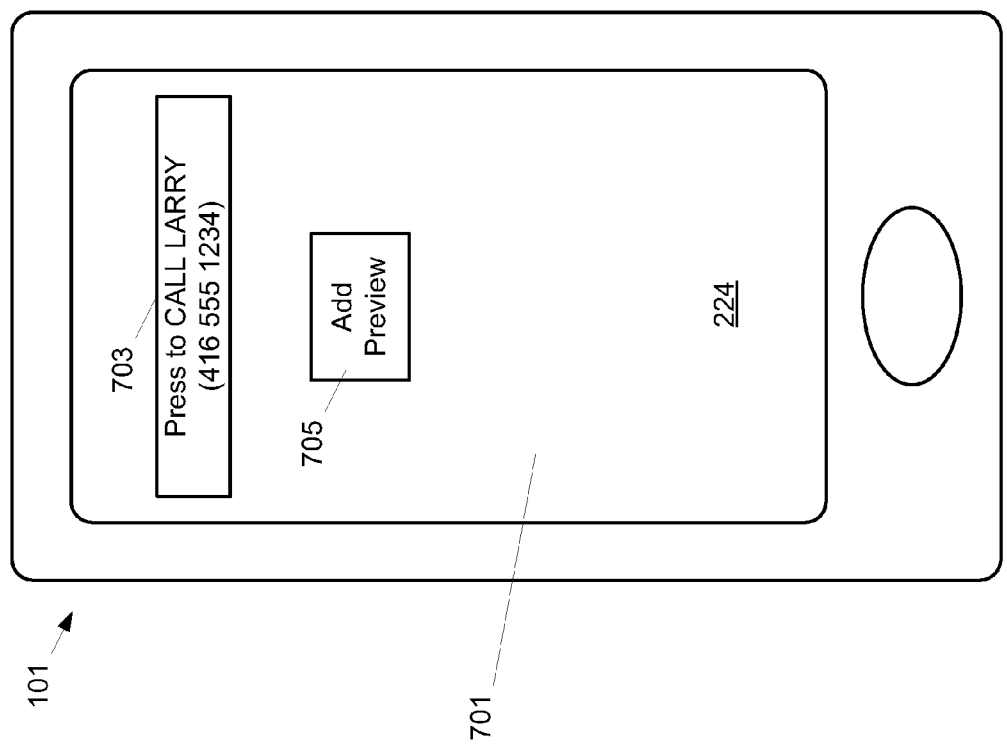
FIGS. 7 to 9 depict Graphical User Interfaces (GUIs) provided at the device of FIG. 2, for providing previews of voice calls, according to non-limiting implementations.

It is further appreciated that, in implementations described with reference to FIGS. 7 to 9, sound data 501 is received after receiving input data indicative preview data 114 is to be transmitted in association with the voice call; in these instances, the input data is received when button 705 or button 905 is actuated.

In other words, receiving the input data comprises receiving actuation data indicative that an actuatable device associated with receiving sound data 110 has been actuated. Indeed, while virtual buttons have been described herein to initiate receipt of sound data 110, it is appreciated that any suitable actuatable device can be used to initiate receipt of sound data 110. For example, a physical button (not depicted) at device 101 can be enabled to initiate receipt of sound data 110 upon actuation thereof. In some implementations, enablement of the physical button to initiate receipt of sound data 501 can be contextual: the physical button can be enabled to initiate receipt of sound data 110 when initiating the voice call (e.g. after call initiation data 110 is transmitted or when an selectable option to call device 103, such as button 703, is provided at device 101).

In yet other implementations, dedicated key sequences can be used to initiate receipt of sound data 501. For example, input device 200 can comprise one or more of a physical keyboard and a virtual keyboard (not depicted), such that the one or more of the physical keyboard and the virtual keyboard comprises an actuatable device associated with receiving sound data 501. The dedicated key sequence can be received one or more of before or after receiving an identifier of device 103. For example, when identifier of device 103 comprises a telephone number, such as "416 555 1234", a dedicated key sequence, such as "#12" can be entered before the telephone number is received and/or after the telephone number is received, which causes receipt of sound data 501 at any suitable point, including but not limited to before voice call is initiated, when voice call is initiated and after voice call is initiated. In some implementations, a subset of the dedicated key sequence can be provided before receipt of an identifier of device 103, and a remaining subset of the dedicated key sequence can be provided after receipt of an identifier of device 103.

In yet further implementations, once an indication is received that preview data 114 is to be transmitted, for example via actuation of an actuatable device, sound data 501 can be received after receiving at least a first ring tone after the voice call initiation, and any other sound data received at microphone 226 before the first ring tone is received is not transmitted in preview data 114.

Several non-limiting example scenarios are now described.

In a first scenario, in preparation for an important meeting, users at an office are distracted with last minute details, and have put their devices, such as device 101, into vibrate and/or silent modes. A member of the office associated with device 101 (i.e. a user of device 101) gets into an accident which delay the meeting and dials a phone number of device 103, which is associated with another member of the office. In addition to dialling the number of device 103, the user of device 101 actuates an "Add Preview" button at device 101, similar to buttons 705, 905, which starts an audio recording as the user of device 101 says "Larry, its Bob. Take this call as there's been an accident". The user of device 101 then presses a "Send" button, such as button 805, which causes call initiation data 110 and preview data 114 to be transmitted to device 103. Hence, as uplink from device 101 to network 105, and downlink from network 105 to device 103 is completed, device 103 renders Caller ID (identification) data at display 324 such as "Incoming call from Bob 416 555 5678" in a dialog box 1003, depicted in FIG. 10, as well as an additional "Listen to call preview?" selectable option, for example in the form of a virtual button 1005. A user of device 103 might be busy preparing for the meeting, and hence would normally ignore the voice call, for example causing the voice call to be sent to voicemail. However, the user of device 103 now has the option to listen to the preview to get crucial information before deciding whether to accept or decline the call. Button 1005 is then actuated such that preview data 114 is provided at device 103, either as sound data 501 played by speaker 328 or as text data 503 rendered at display 324. In any event, once preview data 114 is provided, the importance of the voice call is provided to the user of device 103 and he can decide to take the voice call, during which he might be told (in conversation with the user of device 101) that "I've been in an accident, you will have to do the presentation without me, but I will upload the files in about 15 minutes".

Figure 10:
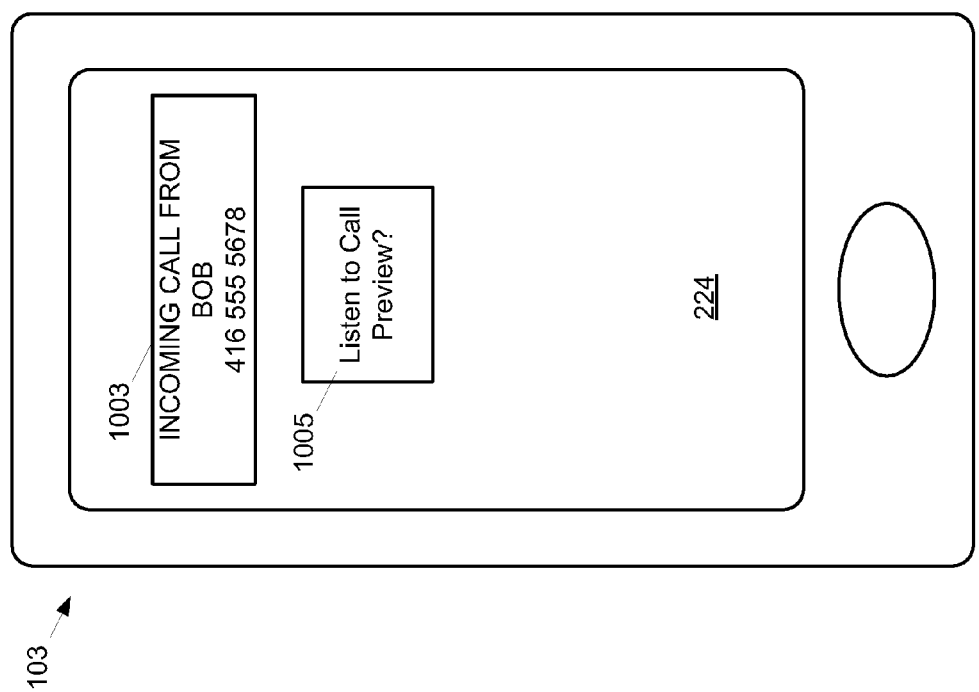
FIG. 10 depicts a GUI provided at the device of FIG. 3, for receiving previews of voice calls, according to non-limiting implementations.

Another non-limiting scenario is depicted at FIG. 10. A user 1101 of device 101 dials a number of device 103 associated with a user 1103. After call initiation data 110 is transmitted to device 103, thereby initiating a voice call, device 103 provides an alert of the voice call (e.g. device 103 starts ringing). A first ring tone is further provided at device 101, which acts as a prompt to provide sound data 501. User 1101 can then either provide sound data 501 without further action or alternatively press a button (i.e. actuate an actuatable device) at device 101 to initiate receipt of sound data 501; in any event sound data 501 (e.g. "Larry, its Bob. Take this call as there's been an accident") is received at microphone 226 and transmitted to device 103 as preview data 114. Upon receipt, device 103 plays sound data 501 at speaker 328. Sound data 501 can be provided in place of the alert at device 103, or in addition to the alert, thereby providing user 1103 with information on whether or not to accept or decline the voice call. It is further appreciated that device 103 can further provide Caller ID (identification) data at display 324.

In some implementations, device 103 can be enabled to convert sound data 501 to text data (i.e. similar to text data 503), which can then be rendered at display 324 of device 101 either in addition to, or in place of speaker 328 playing sound data 501. The text data can be provided along with, or in place of Caller ID data.

Figure 12:
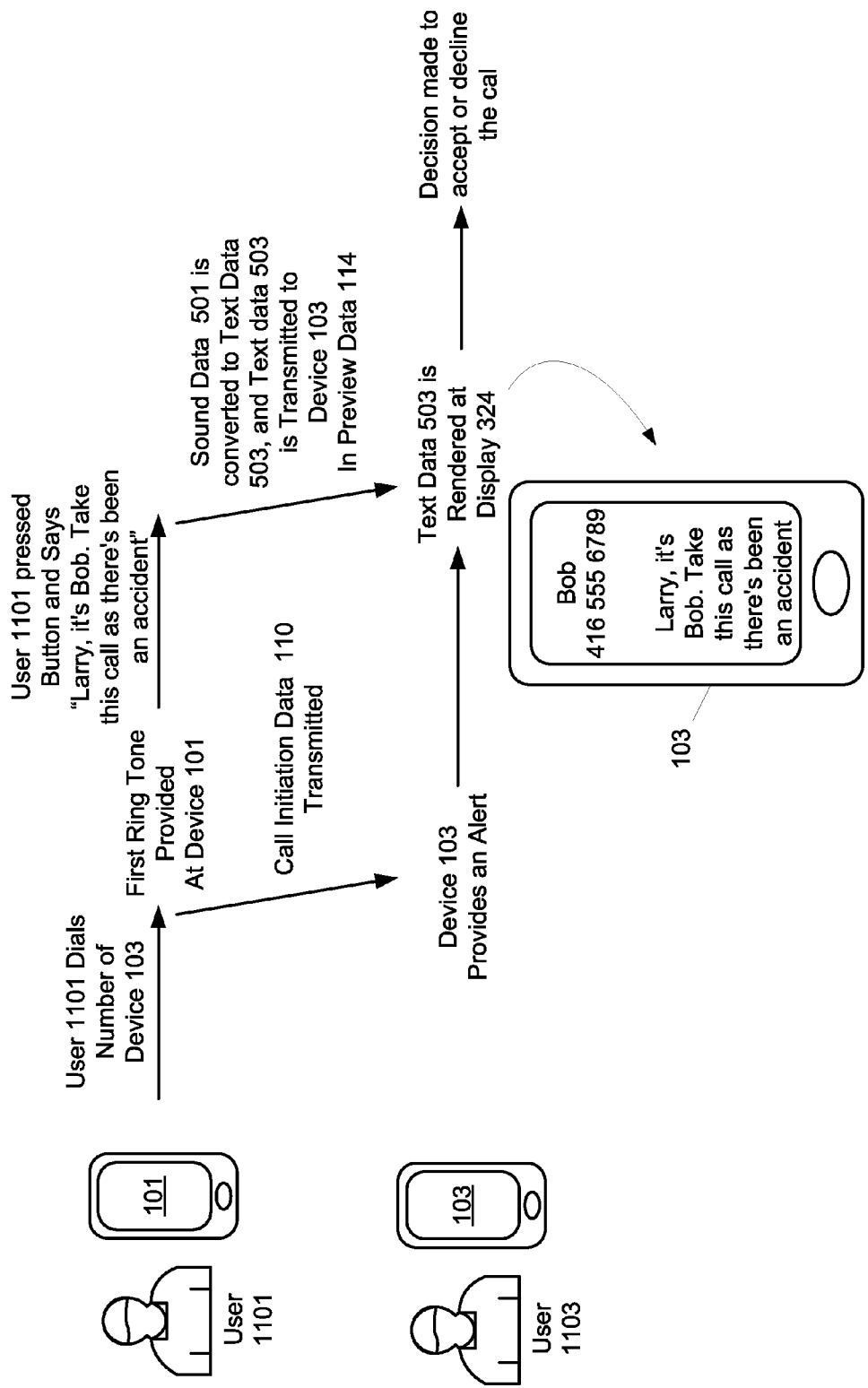

A further non-limiting scenario is depicted at FIG. 12. The example in FIG. 12 is substantially similar to the example in FIG. 12, however in FIG. 12, device 101 converts sound data 501 to text data 503, which is transmitted to device 103 in preview data 114. Text data 503 is then rendered at display 324 of device 101 either in addition to, or in place of Caller ID data.

Figure 11:
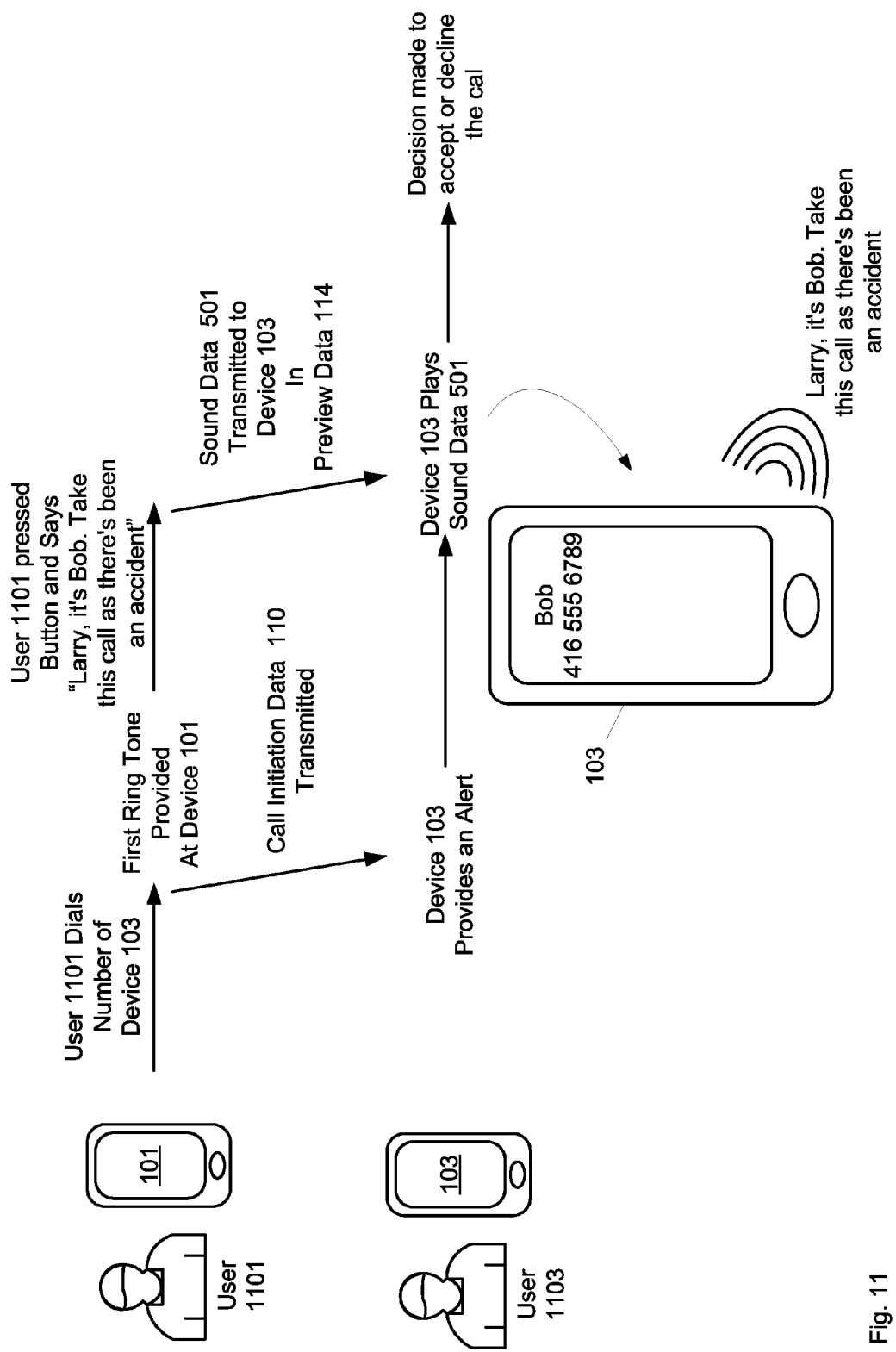
FIGS. 11 and 12 depict scenarios for providing previews of voice calls, according to non-limiting implementations.

It is generally appreciated that implementations described with reference to FIGS. 11 and 12 make use of a 'dead' period, in a voice call, of a few seconds during which device 103 is ringing/providing an alert. During this short time, user 1101 is offered an option to record a speech snippet that describes the nature of the voice call. Such speech snippets are generally short and to the point, but they can comprise very valuable information. For example, with reference to FIG. 10, the speech snippet is sent directly to device 103 (a recipient device) and made accessible for consumption when device 103 is still ringing/providing an alert. Indeed, in some implementations, the speech snippet can replace the ringing tone at device 103. In other words, processor 308 of device 103 can be enabled to one or more of: present preview data 114 at speaker 328; replacing a ringing tone at speaker 328 with preview data 114; provide preview data 114 at speaker 328 as a notification of a voice call; and render preview data 114 at display 324.

With further reference to FIG. 10, user 1101 dials user 1103's phone number. Device 103 starts ringing and user 1101 can hear the first ring tone at speaker 228. A "special" button can be pressed that starts a recording functionality. User 1101 briefly describes the reason for the voice call. User 1103 can, for example, be listening to music through earbuds device 103 when the voice call from device 101 comes in. The speech snippet that user 1101 recorded as the voice call was being placed is played in the earbuds instead of the default ringtone. Alternatively, user 1103 can use a Bluetooth™ headset. In the alternative implementation of FIG. 11, the speech snippet is converted to text and pushed to device 103, where it is rendered alongside Caller ID data (as device 103 is still ringing). In either implementation, based on the extra contextual information provided in preview data 114, user 1103 can decide whether or not to answer the voice call.

The speech-to-text conversion can take place either at device 101, device 103, as described above, or alternatively at the carrier's site (i.e. in infrastructure in network 105).

In some implementations, preview data 114 can be transmitted via embedded within Caller ID data. For example, when speech-to-text conversion occurs at device 101, text data 503 can be pushed to network 105 where it is embedded in Caller ID data, which is in turn pushed to device 103 such that text data 503 is rendered in Caller ID data at display 324 when device 103 provides an alert of the voice call. In alternative implementation, text data 503 can be embedded into the caller ID header.

In some implementations, preview data 114 can be pushed to device 103 by other means than a voice path, for example via a data path including, but not limited to, a text message, SMS (short message service), MMS (multimedia message service), and the like. In these implementations, device 103 is enabled to associate an incoming data message (i.e. preview data 114) with an incoming voice call. For example, in these implementations, device 103 can be enabled to associate a data message and an incoming voice call when they each arrive within a given suitable time period. In other implementations, the data message can comprise an identification number associated with the voice call, such as the telephone number of device 101, which can be compared to the Caller ID data associated with the voice call.

Figure 13:
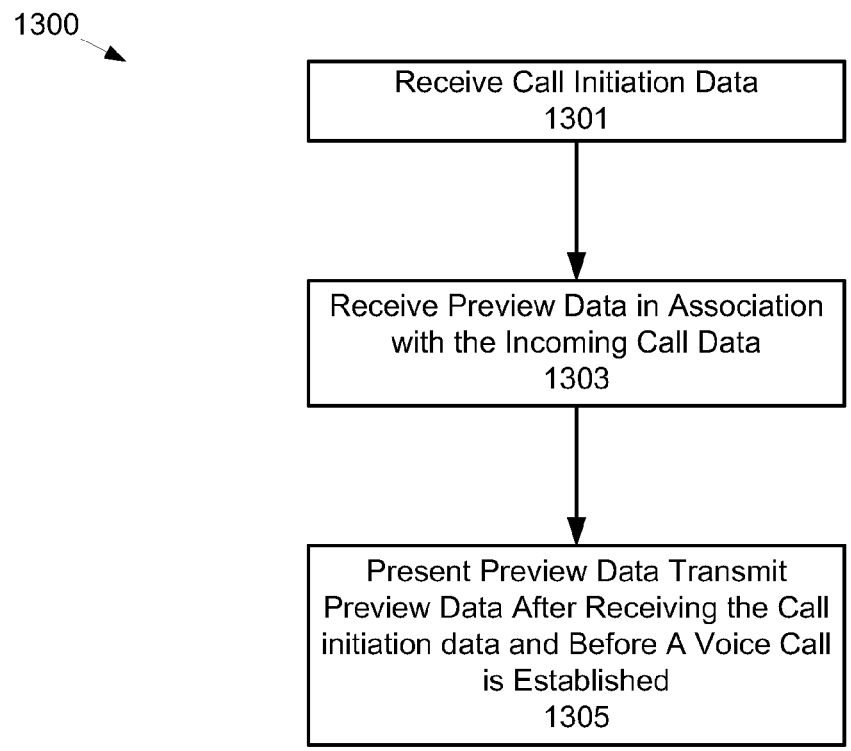
FIG. 13 depicts a method for receiving previews of voice calls, according to non-limiting implementations.

Attention is now directed to FIG. 13 which depicts a method 1300 for providing previews of voice calls. In order to assist in the explanation of method 1300, it will be assumed that method 1300 is performed using system 100. Furthermore, the following discussion of method 1300 will lead to a further understanding of system 100 and its various components. However, it is to be understood that system 100 and/or method 1300 can be varied, and need not work exactly as discussed herein in conjunction with each other, and that such variations are within the scope of present implementations.

It is appreciated that method 1300 is implemented in system 100 by processor 308 of device 103.

At block 1301, call initiation data is received from network 105, via interface 327 the call initiation data indicative that a voice call can be established with device 101. The call initiation data can comprise any suitable data for establishing a voice call with device 101, and can further comprise Caller ID data. It is appreciated that call initiation data referred to with reference to method 1300 can be the same or different from call initiation data 110; for example, call initiation data referred to with reference to method 1300 is generally received from network 105 and is generally enabled to trigger device 103 to provide an alert of a voice call, as well as enable device 103 to accept the voice call. In other words, call initiation data referred to with reference to method 1300 can comprise call initiation data 110 processed by infrastructure of network 105 in an suitable manner to initiate a voice call with device 103.

At block 1303, preview data 114 is received, via interface 327, from device 101. It is appreciated that preview data 114 is received in association with the call initiation data. For example, preview data 114 can be received in any suitable manner, including but not limited to in the call initiation data, in the Caller ID data, in metadata associated with the voice call, in a data path separate from the voice call, in the data path separate from the voice call and within a given time period from receiving the call initiation data, in the data path separate from the voice call with an identifier of the voice call, and the like. It is appreciated that preview data 114 can be received before call initiation data, with call initiation data or after call initiation data.

At block 1305, preview data 114 is presented at one or more of speaker 328 and display 324 after receiving the call initiation data and before the voice call is established, to provide one or more of an audible and a textual preview of the voice call, as described above.

In some implementations, an option to accept or decline preview data can be provided at device 103 (e.g. button 1003), wherein preview data 114 is provided only when the option to accept preview data 114 is selected.

In any event, it is appreciated that preview data 114 can comprise one or more of: recorded sound data 501 playable at speaker 326 to provide the audible preview of the voice call; and text data renderable at display 324 to provide the textual preview of the voice call. It is furthermore appreciated that presentation of sound data 501 device 103 prior to the voice call being established comprises one or more of: presenting preview data 114 at speaker 326; and rendering preview data 114 at display 324.

It is further appreciated that device 103 can be optionally enabled to automatically accept a voice call when associated preview data comprises one or more given key words, which can be stored at non-volatile storage 312. For example, when preview data 114 comprises a key word "emergency" the associated voice call can be automatically accepted.

It is further appreciated that processor 308 of device 103 can be enabled to one or more of: present preview data 114 at speaker 328; replacing a ringing tone at speaker 328 with preview data 114; provide preview data 114 at speaker 328 as a notification of a voice call; and render preview data 114 at display 324.

It is yet further appreciated that, in some implementations, rather than sound data, text data can be received after the voice call is initiated. In other words, processor 308 of device 103 can be enabled to: initiate a voice call to device 103, via interface 227; receive text data via input device 200 (e.g. including but not limited to, a keyboard, a touch screen, or the like), after initiation of the voice call but prior to the voice call being established; and, transmit preview data 114 in association with the voice call device 103, via interface 227, preview data 114 indicative of the text data, and preview data 114 for presentation at device 103 prior to the voice call being established. For example, the text data can be received after receiving at least a first ring tone after the initiation of the voice call. It is furthermore appreciated that a combination of sound data 501 and text data can be received and incorporated into preview data 114, sound data 501 being received before the voice call being initiated and/or prior to the voice call being established, the text data being received after initiation of the voice call but prior to the voice call being established.

It is further appreciated that, in some implementations preview data 114 can be transmitted in two steps: first preview data comprising sound data received before the voice call being initiated, and transmitted with call initiation data 110; and second preview data comprising sound data and/or text data received before the voice call is initiated, but before the voice call is established, and transmitted after call initiation data 110.

Hence, described herein are methods and apparatus for providing a preview of a voice call prior to establishing the voice call. Such a preview enables a better determination of whether to accept or decline the voice call.

Those skilled in the art will appreciate that in some implementations, the functionality of devices 101, 103 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A communication device comprising:
a processor, a communication interface, and a microphone, the processor enabled to: initiate a voice call to a remote communication device, via the communication interface; receive sound data via the microphone, prior to the voice call being established; and, transmitting preview data in association with the voice call to the remote communication device, via the communication interface, the preview data indicative of the sound data, and the preview data for presentation at the remote communication device prior to the voice call being established, wherein the sound data is received at the communication device after receiving at least a first ring tone at the communication device, and after the initiation of the voice call, and any other sound data received at the microphone before the first ring tone is received is not transmitted, the any other sound data different from the sound data received after receiving at least the first ring tone, and at least the first ring tone provided at the communication device to provide an indication that the voice call is being attempted.

2. The communication device of claim 1, wherein the processor is further enabled to:
receive input data comprising an identifier of the remote communication device to initiate the voice call,
wherein the sound data is received after receiving the input data.

3. The communication device of claim 1, wherein the sound data is received after receiving input data indicative the preview data is to be transmitted in association with the voice call.

4. The communication device of claim 3, wherein the processor is further enabled to receive the input data by receiving actuation data indicative that an actuatable device associated with receiving the sound data has been actuated.

5. The communication device of claim 1, wherein the sound data is received after initiation of the voice call.

6. The communication device of claim 1, wherein the processor is further enabled to receive the sound data by recording the sound data, such that the preview data comprises recorded sound data.

7. The communication device of claim 1, wherein the processor is further enabled to convert the sound data to text data such that the preview data comprises the text data.

8. The communication device of claim 1, wherein the processor is further enabled to receive text data via an input device, after initiation of the voice call but prior to the voice call being established, wherein the preview data is further indicative of the text data.

9. A method comprising:
initiating a voice coil to a remote communication device via a communication interface of a communication device; receiving sound data at a microphone of the communication device, prior to the voice call being established; and, transmitting preview data in association with the voice call to the remote communication device, via the communication interface, the preview data indicative of the sound data, and the preview data for presentation at the remote communication device prior to the voice call being established, wherein the sound data is received at the communication device after receiving at least a first ring tone at the communication device, and after the voice call initiation, and any other sound data received at the microphone before the first ring tone is received is not transmitted, the any other sound data different from the sound data received after receiving at least the first ring tone, and at least the first ring tone provided at the communication device to provide an indication that the voice call is being attempted.

10. The method of claim 9, can further comprise:
receiving input data comprising an identifier of the remote communication device to initiate the voice call,
wherein the sound data is received after receiving the input data.

11. The method of claim 9, wherein the sound data is received after receiving input data indicative the preview data is to be transmitted in association with the voice call.

12. The method of claim 11, wherein the receiving the input data comprises receiving actuation data indicative that an actuatable device associated with receiving the sound data has been actuated.

13. The method of claim 9, wherein the sound data is received after initiation of the voice call.

14. The method of claim 9, wherein the receiving the sound data comprises recording the sound data, such that the preview data comprises recorded sound data.

15. The method of claim 9, can further comprise converting the sound data to text data such that the preview data comprises the text data.

16. The method of claim 9, wherein the presentation of the sound data at the remote communication device prior to the voice call being established comprises one or more of:
presenting the preview data at a receiving device speaker;
replacing a ringing tone at the device speaker with the preview data;
providing the preview data at the device speaker as a notification of the voice call; and
rendering the preview data at a receiving device display.

17. The method device of claim 9, can further comprise receiving text data via an input device, after initiation of the voice call but prior to the voice call being established, wherein the preview data is further indicative of the text data.

18. A computer program product, comprising a non-transitory computer usable medium having a computer readable program code adapted to be executed to implement a method for: initiating a voice call to a remote communication device via a communication interface of a communication device; receiving sound data at a microphone of the communication device, prior to the voice call being established; and, transmitting preview data in association with the voice call to the remote communication device, via the communication interface, the preview data indicative of the sound data, and the preview data for presentation at the remote communication device prior to the voice call being established, wherein the sound data is received at the communication device after receiving at least a first ring tone at the communication device, and after the voice call initiation, and any other sound data received at the microphone before the first ring tone is received is not transmitted, the any other sound data different from the sound data received after receiving at least the first ring tone, and at least the first ring tone provided at the communication device to provide an indication that the voice call is being attempted.

* * * * *

UNITED STATES PATENT AND TRADEMARK OFFICE
CERTIFICATE OF CORRECTION

PATENT NO. : 8,880,124 B2  
APPLICATION NO. : 13/309240  
DATED : November 4, 2014  
INVENTOR(S) : Bradley Shayne Ferringo et al.

Page 1 of 1

It is certified that error appears in the above-identified patent and that said Letters Patent is hereby corrected as shown below:

On the Title Page, item (73) (Assignee), delete "Blackberry" and insert -- BlackBerry --, therefor.

In the Claims

Column 13, Line 60, In Claim 9, delete "voice coil" and insert -- voice call --, therefor.

Signed and Sealed this  
Fifteenth Day of September, 2015

Michelle K. Lee  
*Director of the United States Patent and Trademark Office*